March 7, 1933.  F. E. MOFFETT  1,900,725
RELEASE MECHANISM
Filed May 11, 1929  3 Sheets-Sheet 1

Inventor:
Frank E. Moffett
By his Attorney
Clarence D. Kerr

March 7, 1933. F. E. MOFFETT 1,900,725
RELEASE MECHANISM
Filed May 11, 1929 3 Sheets-Sheet 2

Inventor:
Frank E. Moffett
By his Attorney

March 7, 1933.  F. E. MOFFETT  1,900,725
RELEASE MECHANISM
Filed May 11, 1929   3 Sheets-Sheet 3

Inventor:
Frank E. Moffett
By his Attorney
Clarence Kerr

Patented Mar. 7, 1933

1,900,725

UNITED STATES PATENT OFFICE

FRANK E. MOFFETT, OF MAYWOOD, ILLINOIS, ASSIGNOR TO NATIONAL MALLEABLE AND STEEL CASTINGS COMPANY, OF CLEVELAND, OHIO, A CORPORATION OF OHIO

RELEASE MECHANISM

Application filed May 11, 1929. Serial No. 362,178.

This invention is concerned with an improved releasing mechanism whereby a pawl or similar member engaging a gear, ratchet, or other movable element to prevent movement thereof in a given direction may be readily disengaged therefrom. Difficulty in the disengagement of a pawl from a movable element is frequently experienced where said element is tending to move against the restraint of the pawl and bears against the pawl with considerable force. For example, in hand brake mechanisms on railway cars, a toothed element rotatable in a certain direction in the operation of applying the brake is engaged by a pawl to prevent rotation of said element in the opposite direction; the engagement of said pawl with the toothed element serving to hold the brake operating parts in their operated position and thereby to maintain the brake shoes in set or applied position. Owing to the tension in the chain connecting the brake shoes with the brake operating parts the toothed element, as long as the brakes are set, exerts a very substantial pressure against the pawl, thus opposing its disengagement. Consequently, the withdrawal of the pawl to release the brake mechanism and to permit the return of the brake elements to normal unapplied position is effected with difficulty; further operation of the brake mechanism against the tension in the brake chain being necessary to enable the pawl to be disengaged from the toothed element. Through the means which I have provided, the pawl may be expeditiously and easily operated to release the mechanism; and indeed, by my invention, the opposition offered by the brake mechanism to disengagement of the pawl is converted into a positive assistance of such disengagement. Other features of the invention will be hereinafter described and claimed. While I have for purposes of illustration shown my invention applied to a hand brake mechanism, it will be evident that the invention is by no means limited to use therewith and that instead the invention is applicable generally to the disabling of pawls, detents, or other members which restrain elements against movement.

Figure 1:
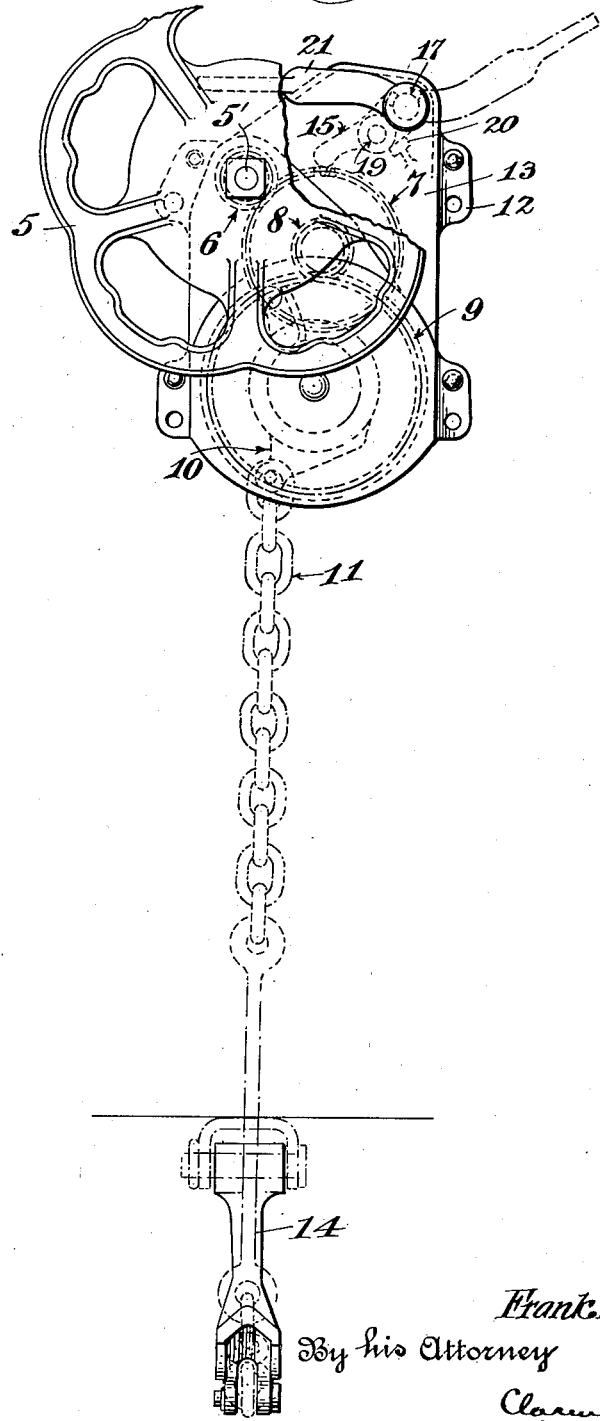
Fig. 1 is a view in front elevation with certain parts broken away, of a hand brake mechanism to which is applied an embodiment of my invention.

Referring to the drawings there is shown in Fig. 1 a brake operating mechanism of standard construction comprising a hand wheel 5 fastened to a shaft 5', a pinion 6 secured to said shaft and engaging a gear wheel 7, a pinion 8 rotatable with gear wheel 7 and engaging a gear 9, and a member 10 rotatable with said wheel 9 and connected to the brake chain 11. The elements 5 to 10 aforesaid are rotatably supported on a base plate 12 to which is secured a housing 13 covering the members 6 to 10 through which shaft 5' projects. The chain 11 is connected to the customary quadrant 14 for transmitting motion to the brake members as is well understood.

The brakes are applied by turning the hand wheel 5 clockwise as viewed in Fig. 1. During this movement of wheel 5 the gear wheel 7 turns counter-clockwise. Engaging the teeth of the gear 7 is the nose 15' of a pawl 15 which permits counter-clockwise rotation of said gear but prevents clockwise movement thereof. Said pawl thus serves to retain the parts in operated position with the brakes applied. Owing to the tension in the brake chain 11, which tends to turn the gear 7 clockwise, the tooth 7' (Fig. 2) of said gear is pressed with considerable force against the pawl 15, so that substantial opposition is offered to disengagement of said pawl from said gear. To enable the pawl to be disengaged from gear 7 with the minimum of effort, and to cause the tension in the brake chain to assist instead of oppose disengagement of the pawl, I provide the mechanism which will now be described.

Figure 2:
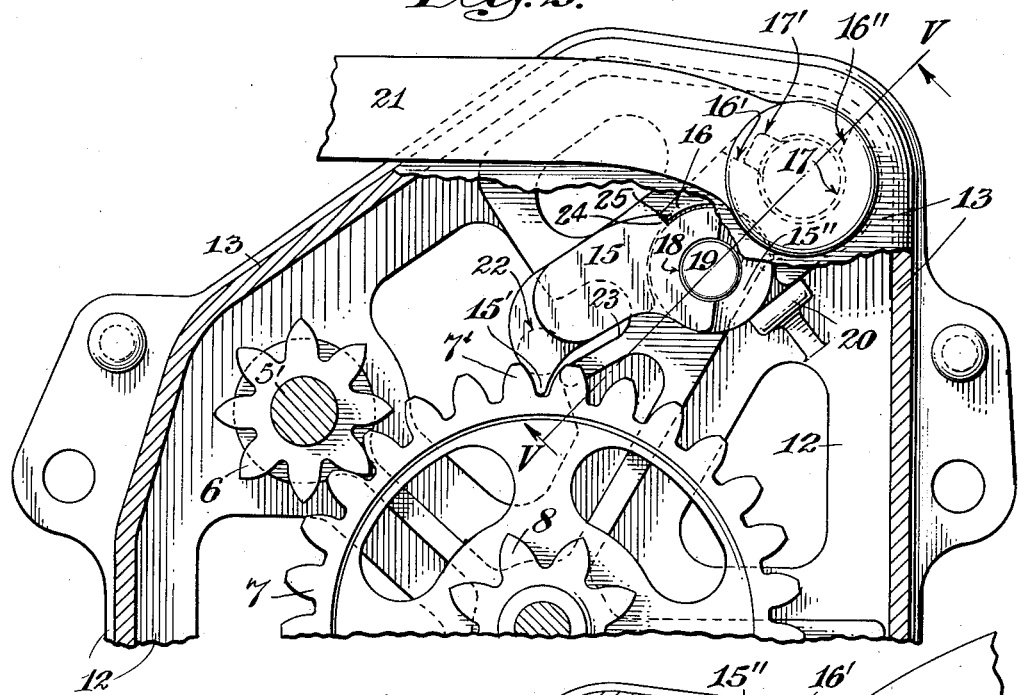
Fig. 2 is a front elevation on a larger scale than Fig. 1, of my improved releasing mechanism and of certain associated parts of the brake operating mechanism, the housing for the parts being shown partly in section and partly in elevation.

The pawl 15 is pivotally connected to an arm 16 which in turn is pivotally mounted on a stud 17 supported in the base plate 12 and housing 13. As shown, the pawl 15 is provided with a hub portion 15" having an aperture 18 which receives a lug or projection 19 on the arm 16. It will be seen that the pawl 15 and the arm 16 together form a toggle. The position of the parts when the pawl nose 15' is in engagement with the gear 7 is shown in Figure 2 wherein it will be seen that the arm 16 as well as the hub portion 15" of pawl 15 abut against a stop 20 projecting from the base plate 12. At this time the axis of the pivot 19 of the toggle 15, 16 is so positioned that the pressure exerted by the wheel 7 against the pawl nose 15' forces said hub 15" and arm 16 against the stop 20 with the result that the gear 7 is precluded from moving clockwise.

The arm 16 is provided with a pair of spaced shoulders 16', 16". Movable within the space between said shoulders and adapted to be engaged therewith for operating the toggle members 15, 16, is a lug 17'. The latter is formed on the stud 17 which is journaled for rotation in the base plate 12 and housing 13. Secured to or formed integral with the stud 17, and positioned outside the housing 13 is a crank arm or handle 21 whereby said stud may be rotated. The normal position of said handle 21 is shown in full lines in Fig. 1 and also in Fig. 2.

Figure 3:
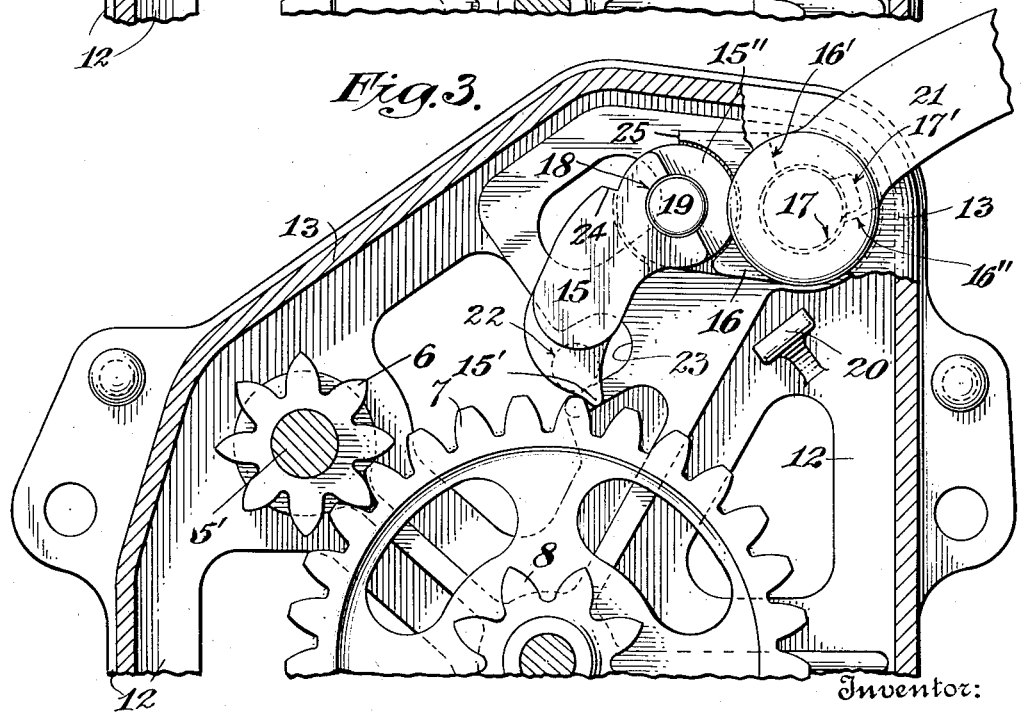
Fig. 3 is a view similar to Fig. 2 but showing the elements of the releasing mechanism in a position wherein the brake operating mechanism is released.
Figure 4:
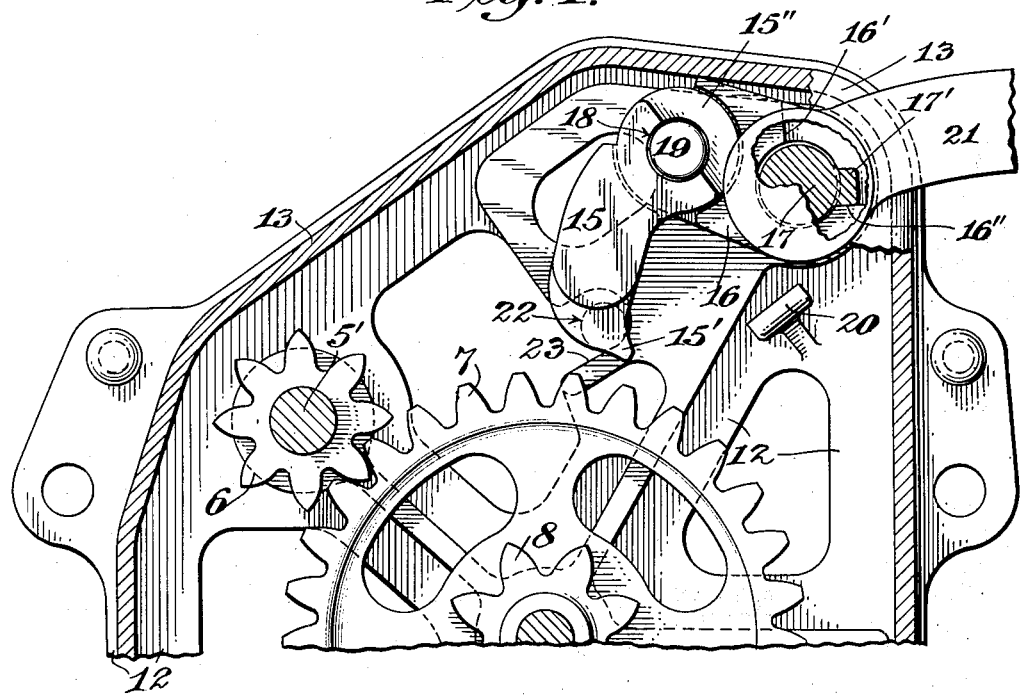
Fig. 4 is a view similar to Figs. 2 and 3 and showing the releasing mechanism completely operated and fully removed from engagement with the brake operating mechanism.
Figure 5:
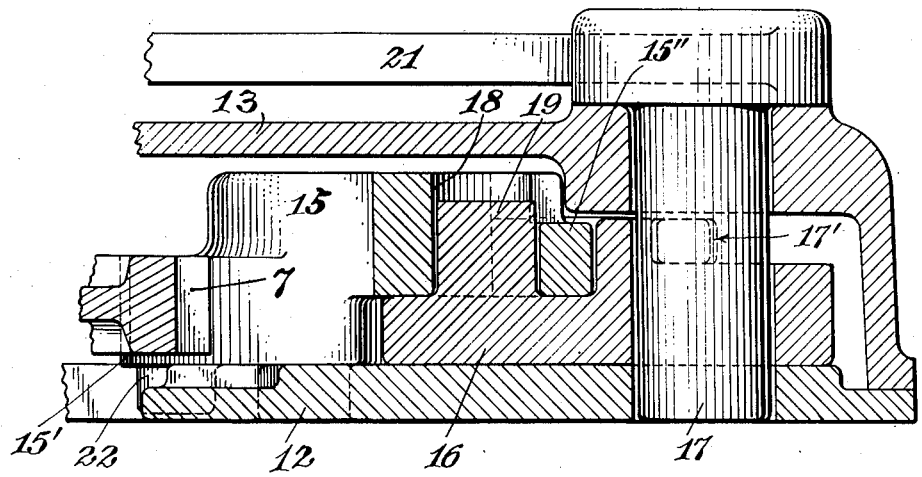
Fig. 5 is a sectional detail view taken on line V—V of Fig. 2.

To release the gear wheel 7 and the brake operating mechanism from the restraining action of the pawl 15, the handle 21 is turned clockwise as viewed in Figs. 1 and 2. Lug 17' is thereby moved away from shoulder 16' and upon coming into contact with shoulder 16" said lug causes arm 16 to turn clockwise about the axis of stud 17. The toggle pivot 19 is thereby moved away from stop 20 and passes to a position wherein the toggle joint is broken, the toggle elements 15, 16 now no longer resisting reverse or clockwise rotation of gear 7. The brake operating parts 5—10 are now released and as a result of the tension in the chain 11 said parts rotate reversely, the gear 7 turning clockwise. It will thus be seen that the pressure exerted by the gear 7 against the pawl 15 instead of resisting disengagement of said pawl, now cooperates in moving said pawl about its pivot 19 to disengaged position as shown in Fig. 3. Upon continued clockwise movement of handle 21 the arm 16 and pawl 15 are moved to the position shown in Fig. 4 wherein the pawl 15 is completely out of the path of gear 7. The handle now occupies its dotted line position shown in Fig. 1.

It will be seen that the lugs 16', 16" on the toggle member 16 are so spaced in relation to the lug 17' on said shaft that a lost motion connection is provided between the handle 21 and the pawl toggle element 16. Due to this lost motion connection the handle 21 may be moved toward the right in Figure 2 a substantial distance before the lost motion is taken up and the element 16 begins to move to break the toggle. This permits the handle to be moved rapidly to the right with considerable force so as to readily break the toggle even when there is a very considerable pressure against the latter, as when the brake is set tightly. The breaking of the toggle under load is thus facilitated. It may further be noted that due to the aforesaid lost motion the handle is moved past its vertical position when the toggle is broken, whereby, due to the weight of said handle, a gravity means is provided for holding the toggle in the position shown in Fig. 4, and thus keeping the pawl clear of the teeth 7 while the brake is unwinding.

It may also be pointed out that during the braking of the toggle the end 15' of the pawl 15 moves in substantially the same direction as does the gear tooth 7' with which it is engaged and that when the toggle is broken the pawl is turned about its pivot 19 by the pressure exerted by the gear 7 and moves out of engagement with said gear by a rolling action. In this way sliding contact between said pawl and the gear tooth is avoided and the wear which would result from a sliding contact is eliminated.

To re-engage the pawl 15 with gear wheel 7 after the brake operating parts have returned to their normal position, the handle 21 is turned counter clockwise to the full line position shown in Fig. 1. During this movement of said handle the toggle members 15, 16 move downwardly and the pawl 15 is re-engaged with the teeth of gear 7. I prefer to provide means for positively guiding the pawl 15 in its movements and particularly to insure its return into proper engagement with the gear 7, and accordingly I have shown a projection 22 on the pawl, which projection cooperates with a cam slot 23 in the base plate 12. Said slot, in cooperation with said projection, guides the pawl positively into correct position for locking the gear 7.

The pawl 15 has a shoulder 24 which is engaged by a stop portion 25 of the member 16 when said pawl is in engagement with the gear 7, as shown in Fig. 2. Upward movement of said pawl from its Fig. 2 position with respect to said member 16 is thereby prevented, and the weight of the member 16 aids in maintaining said pawl in engagement with gear 7 during the winding up of the chain 11. Also, it may be noted that when the pawl 15 is engaged with gear 7 as shown in Fig. 2, the lever 21, through the engagement of lug 17' with lug 16' of member 16, exerts a force which resists movement of said pawl out of engagement with gear 7 during winding of said chain 11.

It will be seen that instead of engaging a gear wheel, such as gear 7, in the train of gearing whereby the brake mechanism is operated, the pawl 15 might equally well engage a ratchet or similar member rotatable with said gearing.

It may also be noted that my mechanism provides for the release of the operating gearing upon only a slight or partial operation of the pawl 15. In other words, movement of the members 15, 16 sufficiently to break the toggle joint removes the restraint against reverse rotation of the gear 7, and the train of gearing may thus rotate reversely before the pawl is completely disengaged from said gear; said reverse rotation furthermore assisting the further movement of said pawl to disengaged position.

The terms and expressions which I have employed are used as terms of description and not of limitation, and I have no intention, in the use of such terms and expressions, of excluding any mechanical equivalents of the features shown and described or portions thereof, but recognize that various structural modifications are possible within the scope of the invention claimed.

What I claim is:

1. In combination, a housing, a toothed element in said housing, a pawl engageable with said element for preventing movement thereof in a given direction, a member pivotally connected to said pawl and forming therewith a toggle, and means cooperating with said toggle for shifting the same to a position wherein said toothed element cooperates to effect disengagement of the pawl therefrom, and means on said pawl and housing cooperating upon movement of the pawl to guide the pawl into and out of engagement with said toothed member.

2. In combination, a toothed element, a support, toggle mechanism comprising a pair of pivotally connected members one of which is engageable with said toothed element for preventing movement thereof in a given direction, and the other of which is pivotally mounted on said support, said latter element also having a pair of spaced shoulders, and a manipulative member having a lug movable therewith in the space between said shoulders and adapted to operate the toggle mechanism by engagement with said shoulders.

3. In combination, a toothed element, toggle means including a pawl engageable with said element for preventing movement thereof in a given direction and an arm carrying said pawl, and manipulative means having a lost motion connection with said arm for operating the toggle.

4. In combination, a housing, toggle means including a toothed element in said housing, a pawl engageable with said element for preventing movement thereof in a given direction, and manipulative means for operating said toggle to disengage said pawl from said element, a recess in said housing, a projection on said pawl adapted to enter said recess upon disengagement of said pawl from the toothed element whereby the pawl is guided to its disengaged position.

In testimony whereof, I have signed my name to this specification this 4th day of May 1929.

FRANK E. MOFFETT.